United States Patent
Kuckertz et al.

(10) Patent No.: US 6,613,394 B2
(45) Date of Patent: Sep. 2, 2003

(54) METHOD OF SURFACE TREATING OR COATING OF MATERIALS

(75) Inventors: Christian Kuckertz, Fallingbostel (DE); Sven Jacobsen, Fallingbostel (DE); Rainer Brandt, Walsrode (DE); Klaus Landes, München (DE); Ralf Hartmann, Richfield, MN (US)

(73) Assignee: Wolff Walsrode AG, Walsrode (DE)

( * ) Notice: Subject to any disclaimer, the term of this patent is extended or adjusted under 35 U.S.C. 154(b) by 9 days.

(21) Appl. No.: 09/800,369

(22) Filed: Mar. 6, 2001

(65) Prior Publication Data

US 2002/0012756 A1 Jan. 31, 2002

(30) Foreign Application Priority Data

Mar. 8, 2000 (DE) .......................................... 100 11 276

(51) Int. Cl.$^7$ .................................................. C08F 2/46
(52) U.S. Cl. .................. 427/488; 427/250; 427/255.18; 427/255.27; 427/255.37; 427/367; 427/371; 427/383.1; 427/393.5; 427/404; 427/409; 427/534; 427/535; 427/536; 427/569
(58) Field of Search ................................ 427/488, 534, 427/535, 536, 569, 250, 255.18, 255.27, 255.37, 367, 371, 383.1, 393.5, 404, 409

(56) References Cited

U.S. PATENT DOCUMENTS

| 4,527,969 A | 7/1985 | Prinz et al. ........... 425/174.8 E |
| 5,576,076 A | 11/1996 | Slootman et al. ........... 427/579 |
| 5,753,193 A | 5/1998 | Slootman et al. ...... 422/186.26 |
| 5,837,958 A | 11/1998 | Förnsel ..................... 219/121.5 |
| 5,944,901 A * | 8/1999 | Landes et al. ........ 118/723 ER |
| 5,952,108 A | 9/1999 | Slootman et al. ........... 428/450 |
| 6,265,690 B1 | 7/2001 | Fornsel et al. |

FOREIGN PATENT DOCUMENTS

| DE | 4212549 | 2/1993 |
| DE | 4325939 | 10/1994 |
| DE | 3631584 | 12/1995 |
| DE | 4438533 | 5/1996 |
| DE | 19546930 | 5/1997 |
| DE | 29805999 | 6/1998 |
| EP | 0 497 996 | 4/1994 |

* cited by examiner

Primary Examiner—Bernard Pianalto
(74) Attorney, Agent, or Firm—Norris McLaughlin & Marcus

(57) ABSTRACT

Described is a method of treating or coating homogeneously at least a portion of the surface of a material selected from metallic materials having a thickness of less than 100 μm and/or polymeric materials. The method of the present invention comprises exposing at least a portion of the surface of the material to an atmospheric plasma generated by an indirect plasmatron. In the method of the present invention, the surface of the material may undergo at least one of an increase in surface tension, a surface grafting, a surface cleaning and a surface sterilization.

10 Claims, No Drawings

METHOD OF SURFACE TREATING OR COATING OF MATERIALS

FIELD OF THE INVENTION

The present invention relates to method of finishing films of plastic and/or metal with an atmospheric plasma.

BACKGROUND OF THE INVENTION

Many finishing steps, such as, for example, printing, coating, lacquering, gluing etc., are possible on films of plastic or metal only if an adequate wettability with solvent- or water-based printing inks, lacquers, primers, adhesives etc. exists. A corona treatment is therefore in general carried out in- or offline with the film processing.

As described e.g. in the publications DE-A-42 12 549, DE-A-36 31 584, DE-A-44 38 533, EP-A-497 996 and DE-A-32 19 538, in this process the materials in web form are exposed to a uniformly distributed electrical discharge. Two working electrodes are a prerequisite, one of which is sheathed with a dielectric material (silicone, ceramic). A high alternating voltage with a frequency typically of between 10 and 100 kHz is applied between the two electrodes, so that a uniform spark discharge takes place. The material to be treated is passed between the electrodes and exposed to the discharge. A "bombardment" of the polymer surface with electrons occurs here, the energy of which is sufficient to break open bonds between carbon-hydrogen and carbon—carbon. The radicals formed react with the corona gas and form new functional groups here. Cleaning of the polymer or metal surface furthermore takes place, since film additives and rolling oils are oxidized and distilled off.

In spite of the broad spectrum of use and the constant further development, corona treatment has significant disadvantages. Thus, a parasitic corona discharge on the reverse occurs, especially at higher web speeds, if the materials in web form do not lie on the cylindrical electrode. The corona treatment furthermore causes a significant electrostatic charging of the materials in web form, which makes winding up of the materials difficult, obstructs the subsequent processing steps, such as lacquering, printing or gluing, and in the production of packaging films in particular is responsible for particulate materials, such as coffee or spices, adhering to the film and in the worst case contributing towards leaking weld seams. Finally, corona treatment is always a filament discharge which does not generate a homogeneously closed surface effect. Moreover, it is found in time that a loss in the surface properties occurs, because of migration of film additives, and that molecular rearrangement based on minimisation of surface energy takes place.

Corona treatment is limited here to thin substrates, such as films of plastic and papers. In the case of thicker materials the overall resistance between the electrodes is too high to ignite the discharge. However, individual flashovers can then also occur. Corona discharge is not to be used on electrically conductive plastics. Dielectric electrodes moreover often show only a limited action on metallic or metal-containing webs. The dielectrics can easily burn through because of the permanent exposure. This occurs in particular on silicone-coated electrodes. Ceramic electrodes are very sensitive towards mechanical stresses.

In addition to corona discharge, surface treatments can also be carried out by flames or light. Flame treatment is conventionally carried out at temperatures of about 1,700° C. and distances of between 5 and 150 mm. Since the films heat up briefly here to high temperatures of about 140° C., effective cooling must be undertaken. To further improve the treatment results, which are in any case good, the torch can be brought to an electrical potential with respect to the cooling roll, which accelerates the ions of the flame on the web to be treated (polarised flame). The process parameters which have to be adhered to exactly are to be regarded as a disadvantage in particular for surface treatment of films. Too low a treatment intensity leads to minor effects which are inadequate. Too high intensities lead to melting of the surfaces, and the functional groups dip away inwards and are thus inaccessible. The high temperatures and the necessary safety precautions are also to be evaluated as disadvantages. For example, the safety regulations in force do not allow pulsed operation of a flame pretreatment unit. It is known that the choice of torch gas allows only certain reactive species (ions and radicals) and that the costs of flame treatment are significantly higher than in the case of corona treatment.

The main disadvantage of corona treatment, the localised microdischarges (filaments), can be bypassed by using a low-pressure plasma. These usually "cold" plasmas are generated by means of a direct, alternating or high-frequency current or by microwaves. With only a low exposure to heat of the—usually sensitive—material to be treated, high-energy and chemically active particles are provided. These cause a targeted chemical reaction with the material surface, since the processes in the gas phase under a low pressure proceed in a particularly effective manner and the discharge is a homogeneous volume discharge cloud. With microwave excitation in the giga-Hz region, entire reactor vessels can be filled with plasma discharge. Extremely small amounts of process means are needed compared with wet chemistry processes.

In addition to targeted activation (modification) of surfaces, polymerizations (coating) and graftings can also be carried out in such processes. As a result of the action of the plasma, conventional polymerization monomers, such as ethylene, acetylene, styrenes, acrylates or vinyl compounds, and also those starting substances which cannot polymerise in conventional chemical reactions can be excited to undergo crosslinking and therefore formation of a polymer or layer. These starting substances are, for example, saturated hydrocarbons, such as methane, silicon compounds, such as tetramethylsilane, or amines. Excited molecules, radicals and molecular fragments which polymerise from the gas phase on to the materials to be coated are formed here. The reaction usually takes place in an inert carrier gas, such as argon. Reactive gases, such as hydrogen, nitrogen, oxygen etc., can advantageously be added in a targeted manner for various purposes.

Established physical and chemical plasma coating processes, such as cathodic evaporation (sputtering) or plasma-activated chemical deposition from the gas phase (PACVD), as a rule take place in vacuum under pressures of between 1 and $10^{-5}$ mbar. The coating processes are therefore associated with high investment costs for the vacuum chamber required and the associated pump system. Furthermore, the processes are as a rule carried out as batch processes because of the geometric limitations due to the vacuum chamber and the pump times needed, which are sometimes very long, so that long process times and associated high piece costs arise.

Coating processes by means of corona discharge advantageously require no vacuum at all, and proceed under atmospheric pressure. Such a process (ALDYNE™) is described in DE 694 07 335 T 2. In contrast to the conventional corona, which operates with the ambient air as the process gas, a defined process gas atmosphere is present in the discharge region in corona coating. By selected precursors, layer systems of the following structure can be obtained: e.g. layers based on SiOx from organosilicon compounds, such as tetramethylsilane (TMS), tetraethoxysilane (TEOS) or hexamethyidisiloxane (HMDSO), polymer-like hydrocarbon layers from hydrocarbons, such as methane, acetylene or propargyl alcohol, and fluorinated carbon layers from fluorinated hydrocarbons, such as, for example, tetrafluoroethene.

A serious disadvantage of the existing processes is, however, the non-closed surface deposition caused by the filament-like discharge characteristics of the corona. The process is accordingly unsuitable for application of barrier coatings. For surface polarisation by introduction of functional groups, in contrast to simple corona discharge, the process is too expensive.

To avoid pin holed coatings over a part area, such as occur in corona coating, atmospheric plasmas can also be generated by arc discharges in a plasma torch. With conventional torch types only virtually circular contact areas of the emerging plasma jet on the surface to be processed can be achieved because of the electrode geometry with a pencil-like cathode and concentric hollow anode. For uses over large areas the process requires an enormous amount of time and produces very inhomogeneous surface structures because of the relatively small contact point.

DE-A-195 32 412 describes a device for pretreatment of surfaces with the aid of a plasma jet. By a particular shape of the plasma nozzle, a highly reactive plasma jet is achieved which has approximately the shape and dimensions of a spark plug flame and thus also allows treatment of profile parts with a relatively deep relief. Because of the high reactivity of the plasma jet a very brief pretreatment is sufficient, so that the workpiece can be passed by the plasma jet with a correspondingly high speed. For treatment of larger surface areas, a battery of several staggered plasma nozzles is proposed in the publication mentioned. In this case, however, a very high expenditure on apparatus is required. Since the nozzles partly overlap, striped treatment patterns can moreover occur in the treatment of materials in web form.

DE-A-298 05 999 describes a device for plasma treatment of surfaces which is characterised by a rotating head which carries at least one eccentrically arranged plasma nozzle for generation of a plasma jet directed parallel to the axis of rotation. When the workpiece is moved relative to the rotating head rotating at a high speed, the plasma jet brushes over a strip-like surface zone of the workpiece, the width of which corresponds to the diameter of the circle described by the rotation of the plasma nozzle. A relatively high surface area can indeed be pretreated rationally in this manner with a comparatively low expenditure on apparatus. Nevertheless, the surface dimensions do not correspond to those such as conventionally present in the processing of film materials on an industrial scale.

DE-A-195 46 930 and DE-A-43 25 939 describe so-called corona nozzles for indirect treatment of workpiece surfaces. In such corona nozzles an oscillating or circumferentially led stream of air emerges between the electrodes, so that a flat discharge zone in which the surface to be treated on the workpiece can be brushed over with the corona discharge brush results. It has been found to be a disadvantage of this process that a mechanically moved component must be provided to even out the electrical discharge, which requires a high expenditure on construction. The specifications mentioned moreover do not describe the maximum widths in which such corona nozzles can be produced and used.

SUMMARY OF THE INVENTION

For the present invention there was the object of treating or coating surfaces of films of plastic and/or metal such that subsequent finishing steps, such as, for example, printing, coating, lacquering, gluing etc., can be carried out without wetting problems and with good adhesion properties.

The aim was pursued here of providing a process which bypasses the disadvantages given by low-pressure plasmas (batch operation, costs), corona (filament-like discharge, treatment on the reverse, electrostatic charging etc.) and plasma nozzles (striped surface treatment).

In accordance with the present invention, there is provided a method of treating or coating homogeneously at least a portion of the surface of a material comprising, exposing at least a portion of the surface of said material to an atmospheric plasma generated by an indirect plasmatron, wherein said material is selected from metallic materials having a thickness of less than 100 µm, polymeric materials and combinations thereof.

Other than in the operating examples, or where otherwise indicated, all numbers expressing quantities of ingredients, reaction conditions, etc. used in the specification and claims are to be under stood as modified in all instance by the term "about."

DETAILED DESCRIPTION OF THE INVENTION

In an embodiment of the present invention, the material that is treated or coated is a material in web form. As used herein the term "material in web form" means a material, preferably a substantially flat material or film, that is collected on and/or taken off of a roll, cylinder or spool. Preferably, the material that is surface treated or coated in the present invention is in the form of a film.

An indirect plasmatron which is suitable for generating the atmospheric plasma in the method of the present invention is described, for example, in EP-A-851 720, the disclosure of which is incorporated herein by reference in its entirety. As used herein and in the claims, by "atmospheric plasma" is meant a plasma that is exposed to the surface of the material under conditions of ambient atmospheric pressure, e.g., at a pressure of 760 torr.

The torch is distinguished by two electrodes arranged coaxially at a relatively large distance. A direct current arc which is stabilised at the wall by a cascaded arrangement of freely adjustable length burns between these. By blowing transversally to the axis of the arc, a plasma jet in band form flowing out laterally can emerge. This torch, also called a plasma broad jet torch, is also characterised in that a magnetic field exerts a force on the arc which counteracts the force exerted on the arc by the flow of the plasma gas. Furthermore, various types of plasma gases can be fed to the torch.

The atmospheric plasma of the method of the present invention is generated by an indirect plasmatron having an elongated plasma chamber therein. In an embodiment of the present invention, the indirect plasmatron comprises, a neutrode arrangement comprising a plurality of plate-shaped neutrodes which are electrically insulated from one another, and which define the elongated plasma chamber of the plasmatron. Preferably, the plurality of neutrodes are present and arranged in cascaded construction. The elongated plasma chamber has a long axis. The neutrode arrangement also has an elongated plasma jet discharge opening that is substantially parallel to the long axis of the elongated plasma chamber, and which is in gaseous communication with the plasma chamber. At least one pair of substantially opposing plasma arc generating electrodes are also present in the indirect plasmatron, and are aligned coaxially with the long axis of the elongated plasma chamber. Typically, the pair of plasma arc generating electrodes are positioned opposingly at both ends of the elongated plasma chamber.

In an embodiment of the present invention, at least one neutrode is provided with a pair of permanent magnets here to influence the shape and position of the plasma arc. Operating parameters, such as, for example, the amount of gas and gas speed, can be taken into consideration by the number, placing and field strength of the magnets employed.

At least individual neutrodes can furthermore be provided with a possibility, e.g. a channel, for feeding a process gas into the plasma chamber. As a result, this process gas can be fed to the arc in a particularly targeted and homogeneous manner. By blowing transversally to the arc axis, a band-like plasma free jet flowing out laterally can emerge. By applying a magnetic field, deflection and the resulting breaking of the arc is prevented.

The method described according to the present invention for surface treatment can be carried out both after a film production and before further processing, i.e. before printing, laminating, coating etc., of films. The thickness of the polymeric film materials may vary, but is typically is in the range of from 0.5 $\mu$m to 2 cm, and preferably in the range of from 10 and 200 $\mu$m.

The method described according to the invention for surface treatment can be used on polymeric materials, but also for the treatment of metallic substrates, but in particular on films of plastic and metal. In particular, the process according to the invention can also be used on polymeric materials in web form which are optionally vapour-deposited with metal, metal oxides or $SiO_x$.

In the context of the present invention, films of plastic are understood in particular as those which comprise a thermoplastic material, in particular polyolefins, such as polyethylene (PE) or polypropylene (PP), polyesters, such as polyethylene terephthalate (PET), polybutylene terephthalate (PBT) or liquid crystal polyesters (LCP), polyamides, such as nylon 6,6; 4,6; 6; 6,10; 11 or 12, polyvinyl chloride (PVC), polyvinyl dichloride (PVDC), polycarbonate (PC), polyvinyl alcohol (PVOH), polyethylvinyl alcohol (EVOH), polyacrylonitrile (PAN), polyacrylic/butadiene/styrene (ABS), polystyrene/acrylonitrile (SAN), polyacrylate/styrene/acrylonitrile (ASA), polystyrene (PS), polyacrylates, such as polymethyl methacrylate (PMMA), cellophane or high-performance thermoplastics, such as fluorine polymers, such as polytetrafluoroethylene (PTFE) and polyvinyl difluoride (PVDF), polysulfones (PSU), polyether-sulfones (PES), polyphenyl sulfides (PPS), polyimides (PAI, PEI) or polyaryl ether ketones (PAE), and in particular also those materials which are prepared from mixtures or from co- or terpolymers and those which are prepared by coextrusion of homo-, co- or terpolymers.

Films of plastic are also understood as those which comprise a thermoplastic material and are vapour-deposited with a metal of main group 3 or sub-group 1 or 2 or with $SiO_x$ or a metal oxide of main group 2 or 3 or sub-group 1 or 2.

Films of metal are understood as films which comprise aluminium, copper, gold, silver, iron (steel) or alloys of the metals mentioned.

Surface treatment by an atmospheric plasma is understood in the context of the present invention as meaning that an increase in the surface tension of the polymer surface takes place by the interaction with the plasma gas. Plasma grafting or plasma coating (plasma polymerization) at or on the surface can furthermore be carried out by means of certain types of plasma gas. The extremely reactive species of the plasma gas can moreover have a cleaning and even sterilising effect on the surface, so that according to the invention surface treatment is also understood as surface cleaning or surface sterilisation.

The polarisation of the polymeric surface leads to an increase in the surface tension. Complete wetting with polar liquids, such as, for example, alcohols or water, becomes possible as a result. While not intending to be bound by any theory, it is believed, based on the evidence at hand, that the polarisation occurs when atoms or molecular fragments (excited by the plasma) react with surface molecules and are consequently incorporated into the surface. Since these are usually oxygen- or nitrogen-containing fragments, surface oxidation is also referred to.

Surface grafting occurs when a targeted incorporation of molecules, preferably at the polymer surface, takes place due to a reaction. Thus, for example, carbon dioxide reacts with hydrocarbon compounds to form carboxyl groups.

A plasma coating is characterised in that a reactive plasma gas is deposited on the surface by a type of polymerization. As a result, it is possible, inter alia, to produce release, barrier, antifogging or quite generally protective layers on the films of plastic and metal.

Surface cleaning is characterised in that impurities, additives or low molecular weight constituents deposited on the surface are oxidized and evaporated off. Sterilisation occurs if the number of germs is reduced such that it lies below the critical germ concentration.

The process gas employed in the method according to the present invention is characterised here in that it comprises mixtures of reactive and inert gases and/or aerosols. Due to the high energy in the arc, excitation, ionisation, fragmentation or radical formation of the process gas and/or aerosol occurs. Because of the direction of flow of the process gas, the active species are carried out of the torch chamber and can be caused to interact in a targeted manner with the surface of films of plastic and/or metal.

The process gas and/or process aerosol with an oxidizing action can be present in concentrations of 0 to 100%, preferably between 5 and 95% by volume based on total volume of the process gas and/or process aerosol. Oxidizing process gases and/or process aerosols which are employed are, preferably, oxygen-containing gases and/or aerosols, such as oxygen ($O_2$), carbon dioxide ($CO_2$), carbon monoxide (CO), ozone ($O_3$), hydrogen peroxide gas ($H_2O_2$), water vapour ($H_2O$) or vaporised methanol ($CH_3OH$), nitrogen-containing gases and/or aerosols, such as nitrous gases ($NO_x$), dinitrogen oxide ($N_2O$), nitrogen ($N_2$), ammonia ($NH_3$) or hydrazine ($H_2N_4$), sulfur-containing gases and/or aerosols, such as sulfur dioxide ($SO_2$) or sulfur trioxide ($SO_3$), fluorine-containing gases and/or aerosols, such as carbon tetrafluoride ($CF_4$), sulfur hexafluoride ($SF_6$), xenon difluoride ($XeF_2$), nitrogen trifluoride ($NF_3$), boron trifluoride ($BF_3$) or silicon tetrafluoride ($SiF_4$), or hydrogen ($H_2$) or mixtures of these. Inert process gases are preferably noble gases, and argon (Ar) is particularly preferred.

Crosslinkable process gases and/or process aerosols which may be used in the method of the present invention include, preferably, unsaturated hydrocarbons, such as ethylene, propylene, butene or acetylene; saturated hydrocarbons with the general composition $C_nH_{2n+2}$, such as methane, ethane, propane, butane, pentane, iso-propane or iso-butane; vinyl compounds, such as vinyl acetate or methyl vinyl ether; acrylates, such as acrylic acid, methacrylic acid or methyl methacrylate; silanes of the general composition $Si_nH_{2n+2}$, halogenated silicon hydrides, such as $SiCl_4$, $SiCl_3H$, $SiCl_2H_2$ or $SiClH_3$, or alkoxysilanes, such as tetraethoxysilane; hexamethyldisilazane; or hexamethyldisiloxane.

Maleic anhydride, acrylic acid compounds, vinyl compounds and carbon dioxide ($CO_2$) are preferably employed as process gases and/or process aerosols which can be grafted, in the method of the present invention.

Preferably, the active and the inert process gas and/or process aerosol are mixed in a preliminary stage and are then introduced into the arc discharge zone. For safety reasons, certain process gas and/or process aerosol mixtures, such as, for example, oxygen and silanes, are mixed directly before introduction into the arc discharge zone.

Plasmas formed in the method according to the present invention are characterised in that their temperatures in the region of the arc are several 10,000 Kelvin. Since the emerging plasma still has temperatures in the range from 1,000 to 2,000 Kelvin, adequate cooling of the temperature-sensitive polymeric materials is necessary. This can in general take place by means of an effectively operating cooling roll.

The contact time of the plasma and film material is of great importance. This should preferably be reduced to a minimum so that no thermal damage to the materials occurs. A minimum contact time with the plasma may be achieved by increasing the speed at which the material is passed before the indirect plasmatron. In an embodiment of the present invention, the material or film is moved over at least one pair of rolls during the exposure step. The speed at which the material or film is moved over the rolls is typically greater than 1 meter (m) per minute, and is preferably from 1 to 600 m per minute, and more preferably from 20 and 600 m per minute.

Since the life of the active species (radicals and ions) under conditions of atmospheric pressure is limited, it is advantageous to pass the films of plastic and/or metal past the torch opening or plasma jet discharge opening (nozzle) at a very short distance. This is typically effected at a distance of 0 to 40 mm, preferably at a distance of 1 to 40 mm, and more preferably at a distance of 1 to 15 mm.

The present invention is more particularly described in the following examples, which are intended to be illustrative only, since numerous modifications and variations therein will be apparent to those skilled in the art. Unless otherwise specified, all parts and percentages are by weight.

EXAMPLES

By employing the plasma broad jet torch described in the method according to the invention, it was possible to modify surfaces of films of plastic and metal in the atmospheric plasma. This was achieved with only a low expenditure on apparatus—compared with other processes—with simultaneously low process costs. Since in the example each neutrode of the plasma torch provides a discharge opening for the plasma gas, this can be fed to the arc in a targeted and homogeneous manner. The band-like plasma free jet flowing out laterally therefore leads to a particularly homogeneous processing of the surface.

Surprisingly, by means of the torch described above it was possible to achieve on various substrates, under atmospheric pressure, surface tensions which are otherwise possible only in a low-pressure plasma.

Surprisingly, it has also been found that in spite of the use of a "hot" plasma generated by an arc discharge, with adequate cooling and an appropriate contact time no thermal damage to the processed films of plastic and metal occurred.

For this, the relevant properties of the following film samples were measured as follows. The thermal damage to the film sections was evaluated visually or by microscopy examinations. The surface tension was determined with commercially available test inks from Arcotec Oberflächentechnik GmbH in accordance with DIN 53364 or ASTM D 2587. The surface tension was stated in mN/m. The measurements were made immediately after the treatment. The measurement errors are ±2 mN/m. The distribution of elements on the film surface was determined by means of ESCA measurements (photoelectron spectroscopy). The distribution of elements was stated here in per cent.

The following film materials were pretreated in various examples using the process according to the invention and were investigated for their surface properties.

Example 1

PE 1: Single-layer, 50$\mu$ thick, transparent blown film, corona-pretreated on one side, of an ethylene/butene copolymer (LLDPE, <10% butene) with a density of 0.935 g/cm$^3$ and a melt flow index (MFI) of 0.5 g/10 min (DIN ISO 1133 cond. D).

Example 2

PE 2: Single-layer, 50$\mu$ thick, transparent blown film, corona-pretreated on one side, of an ethylene/vinyl acetate copolymer (3.5% vinyl acetate) with approx. 600 ppm lubricant (erucic acid amide (EAA)) and approx. 1,000 ppm antiblocking agent ($SiO_2$), with a density of 0.93 g/cm$^3$ and a melt flow index (MFI) of 2 g/10 min (DIN ISO 1133 cond. D).

Example 3

BOPP 1: Single-layer, 20$\mu$ thick, transparent, biaxially orientated film, corona-pretreated on one side, of polypropylene with approx. 80 ppm antiblocking agent ($SiO_2$), with a density of 0.91 g/cm$^3$ and a melt flow index (MFI) of 3 g/10 min at 230° C.

Example 4

BOPP 2: Coextruded, three-layer, 20$\mu$ thick, transparent, biaxially orientated film, corona-pretreated on one side, of polypropylene with approx. 2,500 ppm antiblocking agent ($SiO_2$) in the outer layers, with a density of 0.91 g/cm$^3$ and a melt flow index (MFI) of 3 g/10 min at 230° C.

Example 5

PET: Commercially available, single-layer, 12$\mu$ thick, biaxially orientated film, corona-pretreated on one side, of polyethylene terephthalate.

Example 6

PA: Commercially available, single-layer, 15$\mu$ thick, biaxially orientated film, corona-pretreated on one side, of nylon 6.

Only the non-treated film sides were subjected to the plasma treatment. The process gases oxygen, nitrogen and carbon dioxide were employed, in each case in combination with argon as an inert carrier gas. The gas concentration and the distance from the plasma torch were varied within the series of experiments. The films were investigated visually for their thermal damage. The surface tensions were determined by means of test inks, and the distribution of elements on the surface was determined by means of ESCA measurement. Table 1 provides a summary of the test results.

By the example of PE 1 (no. 4 to 7, table 1) it could be demonstrated that comparable pretreatment effects are achieved up to a distance (film—torch opening) of 10 mm. Only above a distance of 15 mm does the pretreatment level fall significantly.

The materials listed in table 1 were furthermore also pretreated by means of corona discharge for comparison purposes and investigated for their surface tension with test inks directly after the treatment. Energy doses in the range from 0.1 to 10 $J/m^2$—such as are conventional in corona units employed industrially—were used here.

The results of the corona discharge and the plasma treatment (comparison experiments) are compared in table 2.

In the case of polypropylene in particular, a significantly higher surface tension was generated by using the atmospheric plasma. However, higher values compared with corona pretreatment were also determined with PE.

TABLE 2

Surface tension after corona discharge, and plasma treatment according to the method of the present invention.

| Example No. | Material | σ [mN/m] after corona | σ [mN/m] after plasma |
|---|---|---|---|
| 1 | PE 1 | 54 | 62–64 |
| 2 | PE 2 | 42 | 54 |
| 3 | BOPP 1 | 38 | 56–58 |
| 4 | BOPP 2 | 38–42 | 52 |
| 5 | PET | 48–50 | 62–64 |
| 6 | PA | 56 | 60–62 |

The present invention has been described with reference to specific details of particular embodiments thereof. It is not intended that such details be regarded as limitations upon the scope of the invention except insofar as and to the extent that they are included in the accompanying claims.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

TABLE 1

Surface tension values and distributions of elements after plasma pretreatment according to the method of the present invention of various film materials.

| No. | Material | Gas type | Conc. [%] | Distance [mm] | Therm. damage | Speed [m/min] | σ [mN/m] before | σ [mN/m] after | Atom % O | Atom % C | Atom % N | O/C ratio | C/O ratio |
|---|---|---|---|---|---|---|---|---|---|---|---|---|---|
| 1 | PE 1 | — | — | — | — | — | 32 | — | 0.8 | 99.2 | | 0.01 | 118.62 |
| 2 | PE 1 | $O_2$ | 57 | 3 | no | 265 | 32 | 60 | 13.7 | 86.3 | — | 0.16 | 6.28 |
| 3 | PE 1 | $O_2$ | 89 | 3 | no | 265 | 32 | 64 | 11.2 | 88.0 | 0.9 | 0.13 | 7.88 |
| 4 | PE 1 | $O_2$ | 71 | 5 | no | 265 | 32 | 62–64 | | | | | |
| 5 | PE 1 | $O_2$ | 71 | 10 | no | 265 | 32 | 62–64 | | | | | |
| 6 | PE 1 | $O_2$ | 71 | 15 | no | 265 | 32 | 60 | | | | | |
| 7 | PE 1 | $O_2$ | 71 | 20 | no | 265 | 32 | 50–52 | 10.5 | 88.8 | 0.8 | 0.12 | 8.48 |
| 8 | PE 1 | $CO_2$ | 50 | 3 | no | 265 | 32 | 62 | 13.3 | 86.1 | 0.6 | 0.15 | 6.46 |
| 9 | PE 1 | $N_2$ | 50 | 3 | no | 265 | 32 | 62–64 | 10.8 | 86.5 | 2.7 | 0.13 | 7.99 |
| 10 | PE 2 | $O_2$ | 57 | 3 | no | 265 | 32 | 54 | | | | | |
| 11 | PE 2 | $CO_2$ | 50 | 3 | no | 265 | 32 | 46 | | | | | |
| 12 | BOPP 1 | — | — | — | — | — | 32 | — | 0.9 | 98.9 | 0.2 | 0.01 | 113.33 |
| 13 | BOPP 1 | $O_2$ | 84 | 3 | no | 265 | 32 | 50 | | | | | |
| 14 | BOPP 1 | $O_2$ | 89 | 3 | no | 265 | 32 | — | 13.2 | 86.4 | 0.4 | 0.15 | 6.56 |
| 15 | BOPP 1 | $CO_2$ | 73 | 3 | no | 265 | 32 | 58 | 16.0 | 83.4 | 0.6 | 0.19 | 5.21 |
| 16 | BOPP 1 | $N_2$ | 50 | 3 | no | 265 | | — | 2.2 | 95.6 | 2.2 | 0.02 | 42.76 |
| 17 | BOPP 2 | $O_2$ | 57 | 3 | no | 265 | 28 | 48–50 | | | | | |
| 18 | BOPP 2 | $CO_2$ | 50 | 3 | no | 265 | 28 | 52 | | | | | |
| 19 | PET | $O_2$ | 84 | 3 | no | 265 | 32 | 64 | | | | | |
| 20 | PET | $CO_2$ | 73 | 3 | no | 265 | 32 | 62–64 | | | | | |
| 21 | PAB | $O_2$ | 57 | 3 | no | 265 | 41 | 60 | | | | | |
| 22 | PAB | $CO_2$ | 50 | 3 | no | 265 | 41 | 60–62 | | | | | |

σ = surface tension

What is claimed is:

1. A method of treating or coating homogeneously at least a portion of the surface of a material, comprising the steps of exposing at least a portion of the surface of said material to atmospheric plasma generated by an indirect plasmatron, wherein said material is selected from one of metallic materials having a thickness of less than 100 μm, polymetric materials and combinations thereof.

2. The method of claim 1 wherein said indirect plasmatron has an elongated plasma chamber therein, and comprises, a neutrode arrangement comprising a plurality of plate-shaped neutrodes which are electrically insulated from one another, said plurality of neutrodes defining said elongated plasma chamber, said elongated plasma chamber having a longitudinal axis, said neutrode arrangement having an elongated plasma jet discharge opening that is substantially parallel to the longitudinal axis of said elongated plasma chamber, said elongated plasma jet discharge opening being in gaseous communication with said elongated plasma chamber; and at least one pair of substantially opposing plasma arc generating electrodes aligned coaxially with the longitudinal axis of said plasma chamber.

3. The method of claim 2 wherein at least one neutrode is provided with a pair of permanent magnets, said permanent magnets influencing the shape and position of the plasma arc generated by said electrodes.

4. The method of claim 2 wherein at least one of a process gas and a process aerosol are optionally fed into the elongated plasma chamber of said indirect plasmatron during the surface exposure step.

5. The method of claim 4 wherein an inert process gas, and a member selected from an oxidizing process gas, an oxidizing process aerosol, a crosslinkable process gas, a crosslinkable process aerosol, a graftable process gas, a graftable process aerosol and mixtures thereof, are fed into said plasma chamber.

6. The method of claim 2 wherein said elongated plasma jet discharge opening is positioned at a distance of up to 40 mm from the surface of said material.

7. The method of claim 1 wherein the surface of said material is exposed to said atmospheric plasma while moving said material over at least one pair of rolls.

8. The method of claim 7 wherein said material is moved over said rolls at a speed of from 1 to 600 meters per minute.

9. The method of claim 1 wherein the surface of said material undergoes at least one of an increase in surface tension, a surface grafting, a surface cleaning and a surface sterilisation.

10. The method of claim 1 wherein the polymeric material is selected from plastic films and plastic films having a vapour-deposited layer of a member selected from metal, metal oxide and $SiO_x$.

* * * * *

UNITED STATES PATENT AND TRADEMARK OFFICE
CERTIFICATE OF CORRECTION

PATENT NO.   : 6,613,394 B2
DATED        : September 2, 2003
INVENTOR(S)  : Kuckertz et al.

It is certified that error appears in the above-identified patent and that said Letters Patent is hereby corrected as shown below:

Column 11,
Line 6, "to atmospheric plasma" should read -- to an atmospheric plasma --

Signed and Sealed this

Fifteenth Day of March, 2005

JON W. DUDAS
*Director of the United States Patent and Trademark Office*